United States Patent [19]

Oyagi et al.

[11] Patent Number: 5,851,675
[45] Date of Patent: Dec. 22, 1998

[54] APPARATUS HAVING SLIDING MEMBER WITH PRECURSOR MATERIAL PROVIDING SOLID LUBRICANT MATERIAL DURING SLIDING

[75] Inventors: Tomohito Oyagi, Osaka; Mitsuo Nakagawa, Ibaraki; Junji Sakai, Ibaraki; Yoshiyuki Yasutomi, Ibaraki; Takahiko Okouchi, Ibaraki, all of Japan

[73] Assignee: Hitachi, Ltd., Tokyo, Japan

[21] Appl. No.: 454,564

[22] Filed: May 30, 1995

[30] Foreign Application Priority Data

May 30, 1994 [JP] Japan .................................. 6-137850

[51] Int. Cl.⁶ .................................................. B32B 17/00
[52] U.S. Cl. ........................... 428/426; 428/457; 428/688; 428/698; 428/702; 29/724; 384/13; 384/912; 384/918
[58] Field of Search .............................. 118/500; 384/13, 384/912, 913; 428/426, 457, 688, 698, 702; 29/724

[56] References Cited

U.S. PATENT DOCUMENTS

| | | | |
|---|---|---|---|
| 5,040,398 | 8/1991 | Nakagawa | 72/199 |
| 5,072,689 | 12/1991 | Nakagawa | 118/419 |
| 5,252,130 | 10/1993 | Ookouchi | 118/423 |
| 5,380,264 | 1/1995 | Ookouchi | 492/3 |
| 5,403,674 | 4/1995 | Yasutomi | 428/689 |
| 5,538,558 | 7/1996 | Ookouchi | 118/423 |
| 5,571,327 | 11/1996 | Ookouchi | 118/423 |

*Primary Examiner*—Timothy M. Speer
*Attorney, Agent, or Firm*—Antonelli, Terry, Stout & Kraus, LLP

[57] ABSTRACT

An apparatus comprising a plurality of sliding members, at least one of the sliding members being a self-lubricating-function sliding member characterized by containing a precursor compound which produces a solid-lubricating compound during sliding by reacting with an atmosphere in which the sliding member is used or a component of a material with which the sliding member is in sliding contact.

21 Claims, 9 Drawing Sheets

FIG. 5(a)
FIG. 5(b)
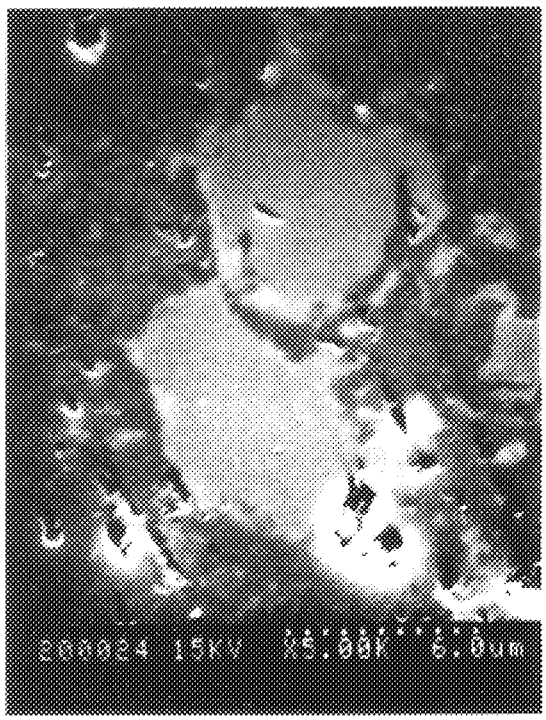
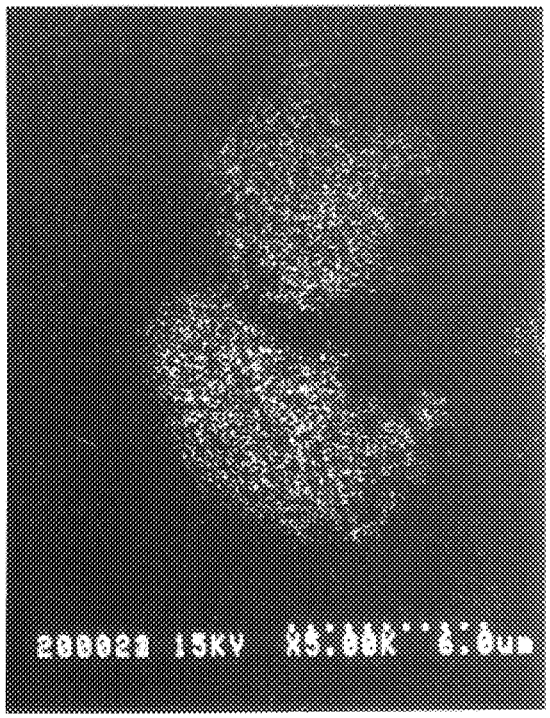
3 µm 5,851,675

APPARATUS HAVING SLIDING MEMBER WITH PRECURSOR MATERIAL PROVIDING SOLID LUBRICANT MATERIAL DURING SLIDING

FIELD OF THE INVENTION

The present invention relates to an apparatus having plural sliding members for use in an environment which requires low friction, low wear and high strength and in which a lubricant is difficult to employ.

BACKGROUND OF THE INVENTION

One example of sliding materials for use in special environments is a sliding material for use in molten metal. To improve resistance to corrosion to molten metal, a sliding material made from ceramics is proposed (for example, Japanese Patent Laid-Open No. 316443/1989). However, since a fluid lubricant, such as a lubricating oil, is impossible to employ in molten metal, there is a demand for a decrease in the friction of the ceramics-made sliding material. Although there is a method in which ceramics capable of being wet with molten metal (Japanese Patent Laid Open No. 79746/1991) are employed to promote fluid lubrication by using the molten metal as a lubricant, this method is unable to realize a sufficient reduction in friction.

One application of the sliding material for use in molten metal is a bearing material for a roll bearing for use in a plating bath of a continuous molten-metal plating apparatus. In this apparatus, the bearing member is inferior in wear resistance and causes looseness during the operation of the apparatus, thereby hindering production of a uniform plating layer. Further, to replace bearing parts, it is necessary to bring the operation to a halt in about ten days in the case of zinc plating or in about four days in the case of aluminum plating.

A sliding member for use in an oxidizing atmosphere or a nitriding-reducing gas atmosphere poses problems such as degradation and corrosion of the material of the sliding member and/or a lubricant. Accordingly, it is desired to develop a sliding member which shows no degradation and low friction in these atmospheres.

To provide a sliding material which can be used in an environment where it is impossible to use any lubricant, a number of methods have been adopted, such as a method of blending or coating a material suited to an individual environment or use conditions with a component having solid-lubricating properties. Examples of the component having solid-lubricating properties are carbon, molybdenum compounds of Group 6B represented by molybdenum disulfide, and hexagonal boron nitride (h-BN). The solid-lubricating properties of these components originate from their crystal structures, i.e., layer structures, as well as rotations at their molecular levels. Although their coefficients of friction are low, their intermolecular bonding is weak and their strength is low. As a result, if such a solid-lubricating material is dispersed in a matrix, the following problems arise. If large amounts of solid-lubricating compounds are contained in a matrix to attain the effect of lubrication, the strength of the sliding material will lower, whereas if the strength of the sliding material is to be retained, the content of the solid-lubricating compound will have to be decreased, so that no sufficient self-lubricating effect can be attained. In addition, materials which are coated or combined with the solid-lubricating compounds involve the problem that solid-lubricating agents peel or fall during sliding.

In addition, from a material which contains a solid lubricating compound, it is impossible to obtain an environment-adaptive type of sliding material which is capable of retaining low friction and low wear not only in its individual special environment but also even when a variation occurs in an environment, by accommodating the variation by itself.

SUMMARY OF THE INVENTION

Accordingly, it is an object of the present invention to provide a sliding material which provides low friction, low wear and sufficient mechanical strength and can resist special environments as well as which, even when a variation occurs in an environment, can show low friction by accommodating the variation by itself.

The present inventors have carried out intensive research on a novel method for realizing lower friction and lower wear, in order to develop a sliding material which provides low friction, low wear and sufficient mechanical strength and can resist special environments as well as which, even when a variation occurs in an environment, can show low friction and low wear by accommodating the variation by itself.

Consequently, the present inventors have invented a self-lubricating-function sliding member capable of producing a solid-lubricating compound during sliding. The solid-lubricating compound is produced from a precursor during sliding via at least one kind of reaction in vapor phase, liquid phase or solid phase. The terms "vapor phase", "liquid phase" and "solid phase" represent phases which constitute an environment in which the sliding member is used and/or a material with which the sliding member is in sliding contact.

The present inventors have also invented a sliding member for use in molten metal, which contains either or both of Zn and Al and employs as a precursor one or more kinds of carbides or borides of Ti, Zr, Nb, V, Ta and Cr. During sliding of the sliding member, on the sliding interface thereof, these borides or carbides react with oxygen present in pores of the sliding member and molten metal and produce as a solid-lubricating compound a complex oxide composed of an oxide of the molten metal and one or more kinds of oxides selected from among Ti, Zr, Nb, V, Ta and Cr oxides. The lubricating material for use in molten metal, which is obtained in the above-described manner, can be applied to various materials for use in molten metal, such as sliding members, sliding-bearing materials, rolling elements in rolling bearings, support materials and components of blast furnaces. If the self-lubricating-function sliding member of the present invention is used for a roll-bearing sliding portion to be placed in molten metal within a molten metal plating apparatus, the wear rate of the bearing portion is reduced and fluctuations of a center of rotation are prevented from easily occurring, so that plated steel plates of good surface finish can be produced over a far longer time.

The present inventors have also invented a sliding member for use in an oxidizing atmosphere, which employs as a precursor one or more kinds of compounds selected from among halides of Pb, Co and Zn, or sulfides, selenides and tellurides of Pb, Zn and Sn, or borides, carbides and suicides of Mo. During sliding of the sliding member, on the sliding interface thereof, such a compound causes an oxidation reaction and produces as a solid-lubricating compound one or more kinds of compounds selected from PbO, $MoO_3$, $Co_2O_3$, ZnO and SnO.

The present inventors have also invented a sliding member for use in a nitriding-reducing gas atmosphere, which employs as a precursor one or more kinds of materials selected from among a boron element, boron oxide, borax and boron carbide. During sliding of the sliding member, on the sliding surface thereof, these compounds cause a nitriding-reducing reaction to produce h-BN as a solid-lubricating compound.

Although any of the above-described examples is of the type in which a precursor produces a solid-lubricating compound by reacting with an atmosphere in which a sliding member is used, the precursor may react by itself or different chemical species of precursors may react with each other to produce a solid-lubricating compound. As one example, the present inventor has also invented a self-lubricating-function sliding member which contains one or more kinds of metals selected from among tungsten, molybdenum and niobium and one or more kinds of elements selected from among sulfur, selenium and tellurium. During sliding of the sliding member, on the surface thereof, a solid-phase reaction between the metals proceeds to produce as a solid-lubricating compound one or more kinds of compounds selected from among sulfides, selenides or tellurides of tungsten, molybdenum or niobium.

In the above-described method in which when a sliding member is slid in an environment in which it is used, its precursor produces a solid-lubricating compound for the first time, thereby realizing lower friction and lower wear, the kind of precursor compound for the solid-lubricating compound or the kind of reacting atmosphere is not limited to any of the above-described examples. Similar effects can be achieved by any other kinds of combinations that can realize self-lubricating properties via reactions.

In the above-described invention, it is desirable that any of the solid-lubricating compounds be produced on a sliding surface at an area rate of 5% or more. In addition, it is desirable that any of the precursors be present in the surface layer of a sliding member at an area rate of at least 5% or more in the state of being uniformly distributed on the sliding surface of the sliding member.

The present inventors have also invented a method of manufacturing the above-described self-lubricating-function sliding member, which method includes the steps of blending a precursor, which is capable of producing by itself a solid-lubricating compound during sliding via at least one kind of reaction in vapor phase, liquid phase or solid phase, with a material powder of any one of ceramics, metal and a polymeric solid, and then sintering the blended product.

The present inventors have invented another manufacturing method which includes the steps of melting a precursor compound, which is capable of producing by itself a solid-lubricating compound during sliding via at least one kind of reaction in vapor phase, liquid phase or solid phase, or melting such precursor compound in a solvent, and then impregnating the molten precursor compound into a matrix having open pores.

The above-described self-lubricating-function sliding members can be used for bearing's sliding members, turbine's sliding components, engine components, piston components, artificial joint components, pump components and magnetic-head sliding components, whereby it is possible to improve the lifetime and the efficiency of these devices.

The present invention pertains to a sliding member characterized by containing a precursor which produces a solid-lubricating compound during sliding by reacting with an atmosphere in which the sliding member is used or a component of a material with which it is in sliding contact. By employing this concept, it is possible to obtain a sliding material which shows excellent friction and wear properties in various environments and has sufficient mechanical strength. It is also possible to obtain a sliding material which can accommodate a variation in an environment by itself. In addition, by applying the sliding members according to the present invention, it is possible to improve the lifetime the efficiency of various devices.

The sliding member contains a precursor which produces a solid-lubricating compound by reacting with an atmosphere in which the sliding member is used or a component of a material with which it is in sliding contact, thereby promoting a solid-lubricating compound producing reaction of the precursor on a sliding surface during sliding by heat, pressure or the like caused by the sliding to realize low friction and low wear on the sliding surface.

During a non-sliding operation or on a non sliding portion, the sliding material according to the present invention retains high strength without producing a solid-lubricating compound. In other words, on only a sliding surface and only during sliding, the sliding material produces a solid-lubricating compound which is needed for realizing lower friction and lower wear. As compared with the prior art method of blending the solid-lubricating compound with a material, the method according to the present invention enables large amounts of solid-lubricating compounds to be present on a sliding surface, thereby realizing a material providing far lower friction, far lower wear and far smaller strength reduction.

In addition, according to the present invention, by preparing a sliding material containing a plurality of kinds of precursor compounds which, during sliding, can vary via different vapor phases, liquid phases or solid phases to produce individual solid-lubricating compounds by themselves, it is possible to produce solid-lubricating compounds for different environments in which the sliding material is used and/or different materials with which the sliding material is in sliding contact. In other words, it is possible to obtain a self-lubricating-function sliding member capable of coping with a variety of environments.

The present invention differs from a method of realizing lower friction and lower wear by using a chemical-reaction boundary lubricating oil which includes a component capable of producing a boundary film having lubricating properties during sliding by reacting with a sliding material. For example, lower friction is realized by preparing a lubricating oil of metallic material, which contains sulfur, chlorine and phosphorus, and, during sliding, forming a metallic salt film having low shearing strength. However, the method assumes the use of such a lubricating oil and is unapplicable to an environment in which no lubricating oil is usable. It is according to the concept of the present invention that it is possible to provide a material which shows excellent low friction and wear properties even in an environment in which no lubricating oil is usable.

The operating principal of the present invention differs from the principal involved with the sliding characteristics of silicon nitride under water. It is said that silicon nitride shows low friction under water or in an atmosphere of high humidity. The reason for this is, it is believed, that hydroxyl groups are bonded to silicon on the surface of silicon nitride. However, according to this method, it is impossible to provide sufficiently lowered friction during sliding under high surface pressure, so that no stable, low friction characteristics can be obtained. Although this method involves a sliding surface layer which reacts, the present invention does not utilize a simple reaction on a sliding surface but instead utilizes a solid-lubricating compound produced from a reaction induced by sliding, thereby making it possible to provide stable, low friction characteristics. Many other similar phenomena are observed. In one phenomenon, a substance on a sliding surface of a sliding member varies by the tribochemical reaction of the sliding surface and the varied substance becomes liable to easily peel at the interface between the varied substance and the sliding member, thereby providing lowered friction. However, the aforesaid concept of producing a solid-lubricating compound having a layer or chain-formed crystal structure via a reaction or having cleavage properties in itself is unique to only the present invention.

The method of producing a self-lubricating substance by a reaction on a surface of a sliding member is also used in an in-situ process which is one method of producing a solid lubricating coating. This method includes the steps of plating a steel surface with molybdenum or tungsten and then causing it to react with sulfur or a sulfur compound to form a layer of tungsten sulfide or molybdenum sulfide. However, this method is a method of producing and depositing a self-lubricating compound during the manufacture of a sliding member, i.e., prior to sliding of the sliding member, and there is an essential distinction in friction lowering mechanism between the method and the present invention which produces a solid-lubricating compound by utilizing, as a reaction driving force, frictional heat and/or surface pressure occurring during sliding.

The present invention also differs from a method of preparing a sliding member which contains a carbide of titanium or the like and producing free carbon from the sliding member during sliding to lower friction. In this case, however, free carbon contained in the carbide greatly contributes to the lowering of friction, and use is made of carbon contained in the material prior to sliding of the sliding member. This concept differs from the basic concept of the present invention which produces a solid-lubricating compound by utilizing, as a reaction driving force, frictional heat and/or surface pressure occurring during sliding. In addition, in the aforesaid case, if carbon occurs during sliding, the produced carbon is immediately oxidized to form carbon dioxide which is a gas, with the result that carbon substantially is not produced. Such mechanism differs from the basic concept of the present invention of the producing a solid-lubricating compound.

BRIEF DESCRIPTION OF THE DRAWINGS

FIG. 5 is a microphotograph showing the crystal structure of a sample according to an example of the present invention.

DETAILED DESCRIPTION OF THE PREFERRED EMBODIMENTS

Figure 1:
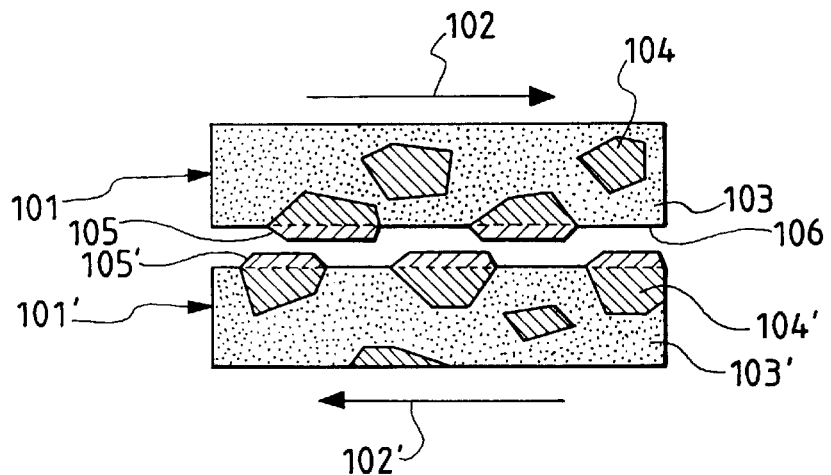
FIG. 1 is a schematic view showing an embodiment of the present invention.

FIG. 1 is a schematic view showing an embodiment of the present invention. FIG. 1 shows a pair of sliding members generally designated by the reference numbers 101, 101' which slide against one another, each sliding in the respective directions shown by the arrows 102, 102'. The sliding members 101, 101' are made of a matrix material 103, 103' having dispersed therein a precursor material 104, 104' which can provide a solid lubricant material 105, 105' on the sliding surfaces 106, 106' of the respective sliding members 101, 101'. Of course, only one of the pair of sliding members 101, 101' need be a self-lubricating member.

The precursor 104, 104' may produce the solid lubricant material by chemical reaction with the atmosphere (gas and/or liquid) in which the sliding members are used upon heat and pressure induced by sliding, as shown by the following:

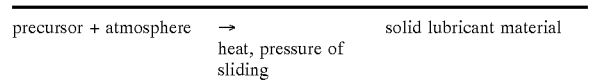

Alternatively, the precursor 104 or 104' in one sliding member may produce the solid lubricant material by chemical reaction with the material of which at least the surface of the other sliding member is made upon heat and pressure induced by sliding, as shown by the following:

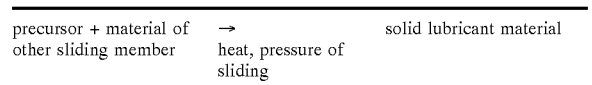

Alternatively, the sliding members 101, 101' may have precursor materials 104, 104' which comprise a plurality of types of elements or compounds, e.g. precursor A and precursor B which react with each other upon heat and pressure induced by sliding, as shown by the following:

```
precursor A + precursor B    →              solid lubricant material
                       heat, pressure of
                       sliding
```

The precursor material 104, 104' is preferably uniformly dispersed in the matrix 103, 103' in an amount of at least 5 vol. % so as to produce a sufficient amount of solid lubricant material 105, 105' on the sliding surface 106, 106'. The upper limit of precursor material 104, 104' is not particularly limited so long as the strength and density of the sliding members 101, 101' are not adversely affected. For example, if the precursor material 104, 104' is contained in a ceramic matrix 103, 103' in an amount greater than 80 vol. %, the strength and density can be adversely affected since the sliding members 101, 101' may become too porous.

The particle size of the precursor material 104, 104' should be large enough to avoid decomposition thereof upon sintering and small enough to be able to obtain a fairly uniform distribution in the matrix 103, 103'.

The present invention will be described more specifically with reference to examples.

EXAMPLE 1

Sialon ceramics which contained the respective precursors shown in Table 1 by 20 vol. % were prepared. These sialon ceramics were respectively prepared by blending the precursors about 5 µm in particle diameter with granulated powder within an organic solvent, blending the obtained products with an about 2 wt. % press-forming binder, drying and screening the thus-obtained products to prepare forming materials, press-forming the forming materials into products 60 mm in diameter×15 mm thick, heating the obtained products up to near 1,700° C. under a pressure of 300 kg/cm$^2$ in a nitrogen atmosphere, and holding them for one hour to sinter them by hot press.

Figure 2:
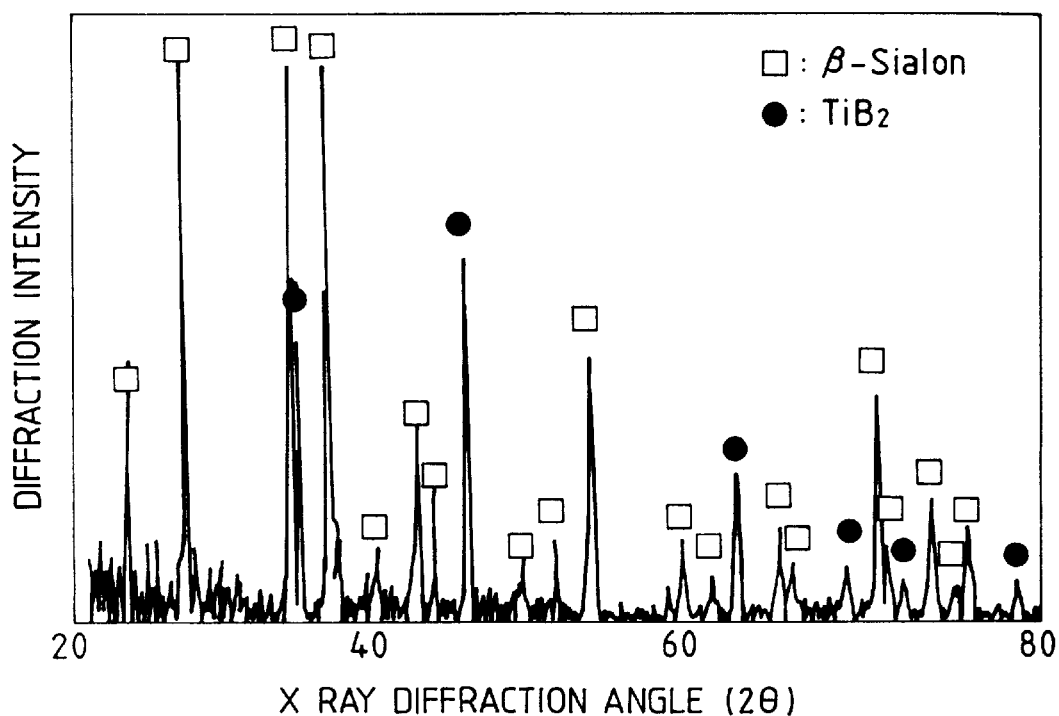
FIG. 2 is an X-ray diffraction diagram of a sample according to an example of the present invention.

From X-ray diffraction of the sintered bodies, it was confirmed that any of the sintered bodies consisted essentially of β-sialon and blended borides and carbides. As one example, the case of Experiment No. 2 is shown in FIG. 2. It can be seen that peaks are obtained for β-sialon and $TiB_2$ and the sintered body is composed of β-sialon and $TiB_2$.

Figure 3:
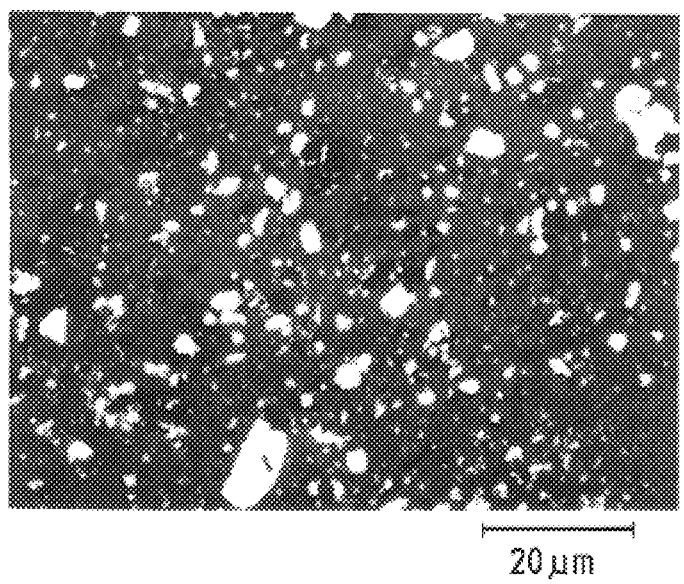
FIG. 3 is a microphotograph showing the crystal structure of a sample according to an example of the present invention.
Figure 4A:
FIG. 4 is a microphotograph showing the crystal structure of a sample according to an example of the present invention.
Figure 4B:
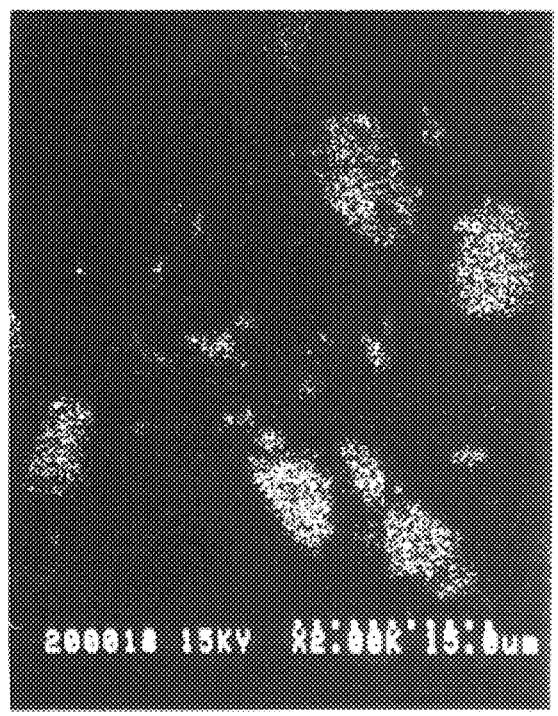

An optical microphotograph of the sample obtained in Experiment No. 2 is shown in FIG. 3. An electron microphotograph of the sample obtained in Experiment No. 2 and a plane analysis of Ti by EPMA are shown in FIGS. 4 and 5. The photographs of FIGS. 4(a) and 5(a) respectively correspond to the plane analyses shown in FIGS. 4(b) and 5(b). From FIGS. 2 to 5, it can be seen that this composite material has a structure in which $TiB_2$ particles are dispersed in a matrix of β-sialon. Of course, the other samples provided similar effects and similar structures in which blended boride or carbide particles were dispersed in a matrix of ceramics.

The bending strengths of the sintered bodies which were bent at four points at room temperature showed approximately 1,000 Mpa or more as shown in Table 1, and no remarkable decrease in strength due to the blending of the precursors was observed.

Figure 6A:
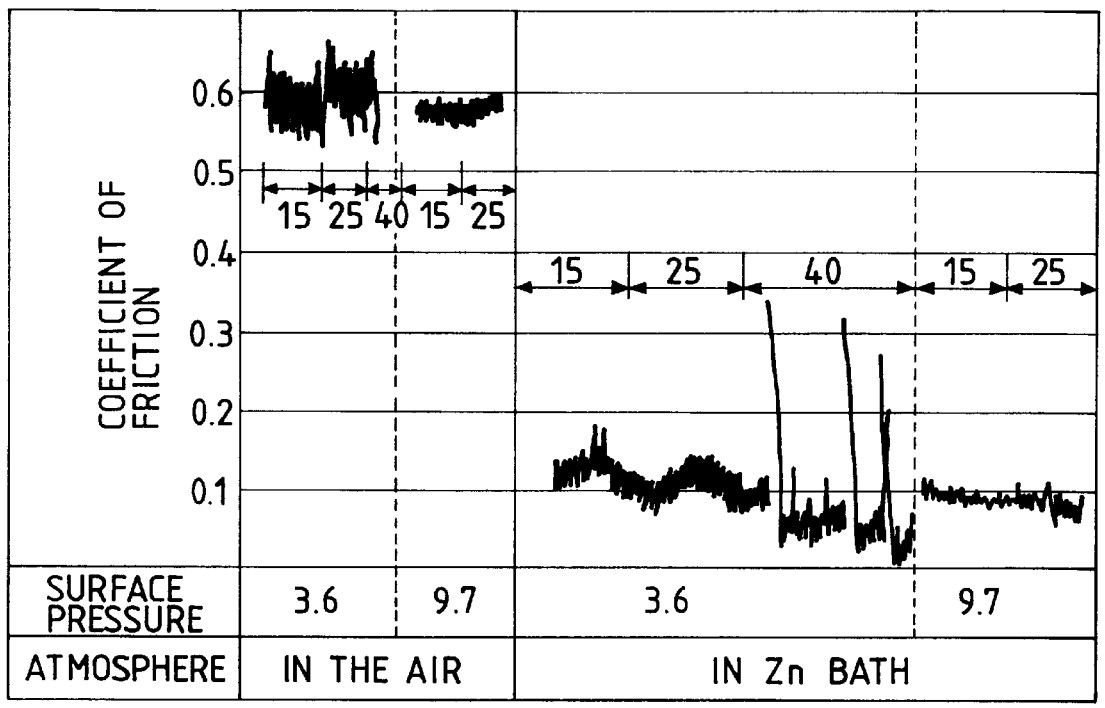
FIG. 6 is a diagram showing the relationship between a coefficient of friction and a surface pressure according to an example of the present invention.
Figure 6B:
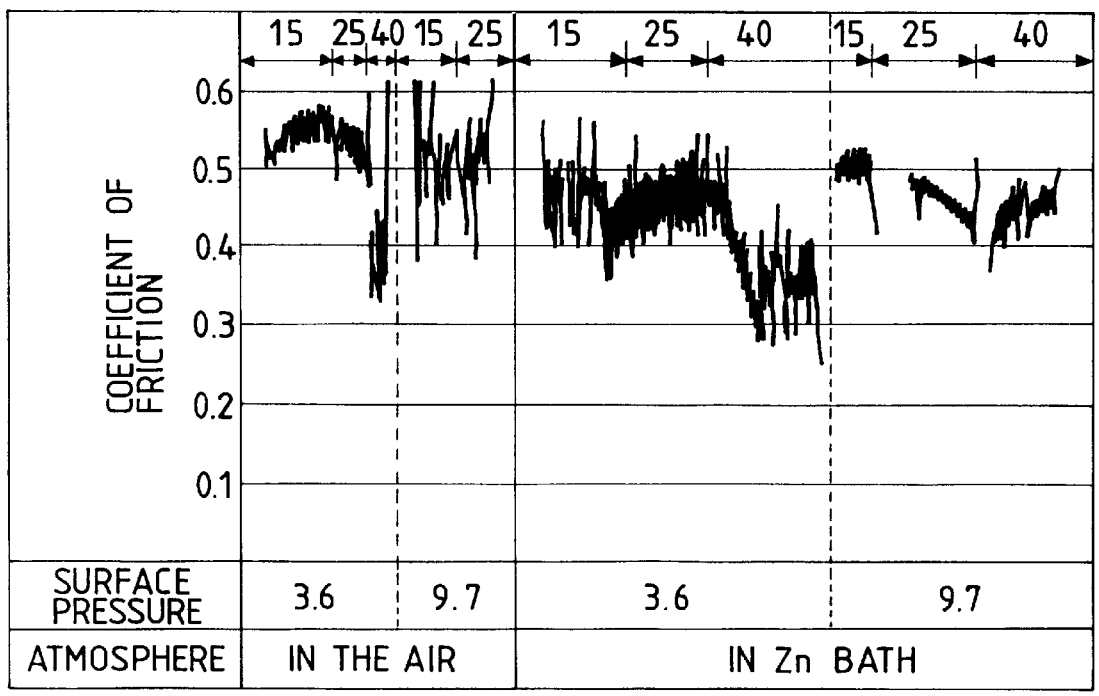

The obtained sintered bodies were respectively formed into sleeve-shaped shaft portions (external diameter: φ60 mm, internal diameter: φ40 mm, and thickness: 20 mm) as well as bearing portions each having a face of R30. They were made to slide in both the air and a 470° C. molten zinc bath under the conditions of a peripheral velocity of 25 m/min and a surface pressure of 3–9 kg/cm$^2$, and their coefficients of friction and amounts of wear were measured. By way of example, the measurement results in Experiment Nos. 1 and 2 are illustrated. FIGS. 6(a) and 6(b) correspond to Experiment Nos. 2 and 1, respectively. The numbers represented in the graph of each of FIGS. 6(a) and 6(b) indicate peripheral velocities (unit: m/min). The sialon ceramics in which $TiB_2$ particles were dispersed showed coefficients of friction of about 0.1 in the molten zinc bath with respect to about 0.5 in the air, and no substantial wear was observed. In other experiments, similar effects were obtained. In contrast, Experiment No. 1 in which sialon ceramics were slid on each other showed a coefficient of friction in the molten zinc bath which was a high value nearly equal to that obtainable in the air. The results are summarized in Table 1.

In addition, from X-ray diffraction and composition analyses by EPMA with respect to their sliding surfaces after the samples were slid in the molten zinc bath, it was confirmed that the self-lubricating compounds shown in Table 1 were produced from the respective samples.

TABLE 1

| EXPERIMENT No. | PRECURSOR | BENDING STRENGTH (MPa) | COEFFICIENT OF FRICTION | | SELF-LUBRICATING SUBSTANCE PRODUCED ON SLIDING SURFACE AFTER SLIDING IN Zn BATH |
|---|---|---|---|---|---|
| | | | IN THE AIR | IN Zn BATH | |
| 1 | NOT USED | 1224 | 0.55 | 0.55 | NOT USED |
| 2 | $TiB_2$ | 1224 | 0.55 | 0.11 | $Zn_2TiO_4$ |
| 3 | $ZrB_2$ | 1104 | 0.50 | 0.09 | $ZnZrO_3$ |
| 4 | $NbB_2$ | 1005 | 0.55 | 0.10 | $ZnNb_2O_6/Zn_3Nb_2O_8$ |
| 5 | $VB_2$ | 1084 | 0.50 | 0.11 | $ZnV_2O_6/Zn_2V_2O_7$ |
| 6 | $TaB_2$ | 1050 | 0.55 | 0.09 | $ZnTa_2O_6$ |
| 7 | $CrB_2$ | 1054 | 0.52 | 0.10 | $ZnCrO_4/ZnCr_2O_4$ |
| 8 | TiC | 1130 | 0.45 | 0.09 | $Zn_2TiO_4$ |
| 9 | ZrC | 1202 | 0.47 | 0.08 | $ZnZrO_3$ |
| 10 | NbC | 1106 | 0.49 | 0.07 | $ZnNb_2O_6/Zn_3Nb_2O_8$ |
| 11 | VC | 1098 | 0.51 | 0.07 | $ZnV_2O_6/Zn_2V_2O_7$ |
| 12 | TaC | 1050 | 0.52 | 0.08 | $ZnTa_2O_6$ |
| 13 | $Cr_2C_3$ | 1099 | 0.48 | 0.06 | $ZnCrO_4/ZnCr_2O_4$ |

Similar effects can be obtained by using, as matrix ceramics, nitride ceramics consisting essentially of silicon nitride, aluminum nitride or the like and oxide ceramics consisting essentially of alumina, silica, zirconia or the like.

Metals other than zinc, such as aluminum and zinc-aluminum alloy, can be used as the molten metal, and lowerings in their coefficients of friction due to a similar mechanism can be observed.

EXAMPLE 2

Figure 7:
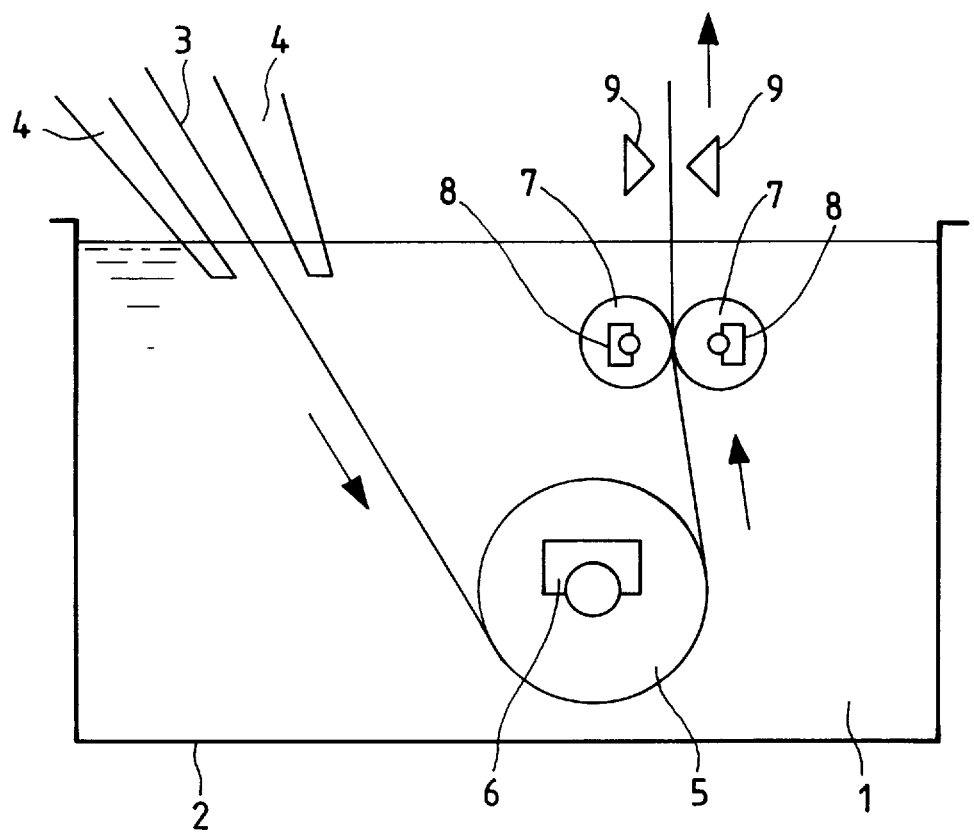
FIG. 7 is a schematic view showing a portion of a molten-metal plating apparatus according to an embodiment of the present invention.

Another example will be described below. In the following example, slide bearings each having a sliding surface using a self-lubricating-function sliding member for use in molten metal devised according to the present invention were applied to bearing portions for a sinking roll and supporting rolls provided in the molten-zinc-metal plating apparatus shown in the schematic view of FIG. 7. As shown in FIG. 7, a plating bath 1 is provided in plating tank 2. Strip 3 to be plated is introduced into plating bath 2 between skirts 4. The strip 3 is directed under and around sinking roll 5 which is supported by sinking roll bearing 6 and out of the plating bath 1 after passing between and being rolled by finishing rolls 7 supported by bearings 8. After exiting the bath 1, the strip 3 passes between wiping nozzles 9. In addition, the slide bearings 6,8 according to the present invention were compared with conventional examples in which an anti-corrosion alloy, a cermet, graphite and sialon ceramics were used for their sliding surfaces.

Figure 8:
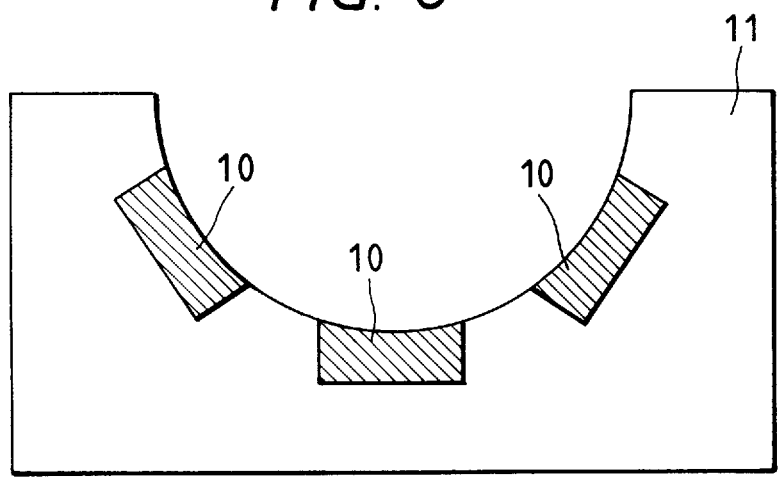
FIG. 8 is a cross-sectional view of bearing portions for a sinking roll and supporting rolls according to an embodiment of the present invention.

Each of the bearings 6,8 had a bearing support 11 and a sliding surface in which a material 10 for use on a sliding surface was incorporated as shown in FIG. 8.

Figure 9:
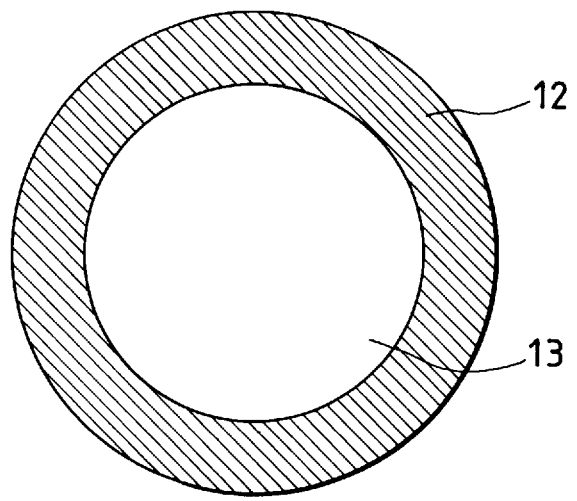
FIG. 9 is a cross-sectional view of a shaft portion for each of the sinking roll and the supporting rolls according to an embodiment of the present invention.

In each shaft portion, the material for use on a sliding surface was fitted onto a roll shaft 13 in the form of a sleeve 12 as shown in FIG. 9.

The shaft portions and the bearing portions which had the above-noted structures were installed as bearings for the sinking roll and the supporting rolls of the molten-zinc-metal plating apparatus, and an operation was carried out.

In the example where the material for use on its sliding surface was an anti-corrosion alloy or a cermet, erosion was serious, while in the example where graphite was used, wear was serious. In both cases, the rolls suffered looseness and no uniform plating layers were formed, so that the bearing portions were forced to be replaced in about ten days. In the example where sialon ceramics, bites occurred between the shafts and the bearings, so that the rolls did not smoothly operate. In contrast, in the example in which the self-lubricating-function sliding member according to the present invention was used as the material for use on a sliding surface, the rolls smoothly operated (with a coefficient of friction of 0.1 or less) and the shafts and the bearings substantially did not wear, so that no problem is encountered even after 40 days of continuous operation.

When molten aluminum and molten zinc-aluminum alloy were used as molten metal, similar results were obtained.

EXAMPLE 3

Sliding materials having structures in which the precursors shown in Table 2 were dispersed in the shown matrices were prepared. The sliding materials each having a matrix of $ZrF_4$-base glass or GeS-base glass were prepared by blending precursor powder (20 vol. % based on the matrix glass) with starting material powder by and subjecting the obtained product to a melting process in an argon gas. Each of the $ZrF_4$-base glass and the GeS-base glass was melted at melting temperatures from 700° to 900° C. for a melting time of about 30 minutes, and the obtained molten liquid was transferred to a carbon mold, followed by cooling and vitrification. The sialon ceramics of Experiment Nos. 31–34 were processed in a method similar to that used in Example 1. The coefficients of friction between the thus-obtained sliding materials were compared with the coefficients of friction between sliding materials formed of matrix materials containing no precursor powder. These coefficients of friction were measured in both the air and the argon gas by a method similar to that used in Example 1. The results are summarized in Table 2.

As can be seen from the results shown in Table 2, lower coefficients of friction were obtained when the sliding members containing the precursor compounds were slid in the air.

In addition, from X-ray diffraction and composition analyses by EPMA with respect to their sliding surfaces before and after the sliding of the sliding members, it was confirmed that the self lubricating compounds shown in Table 1 were produced from the respective samples. The components produced from the respective samples during sliding are summarized in Table 2.

In addition, by blending these precursor compounds with metal powder or sinterable polymeric powder and sintering the obtained products, it is possible to provide a self-lubricating-function sliding material of low friction owing to a similar mechanism.

TABLE 2

| EXPERIMENT | | | COEFFICIENT OF FRICTION | | SELF-LUBRICATING SUBSTANCE PRODUCED ON SLIDING SURFACE |
|---|---|---|---|---|---|
| No. | MATRIX | PRECURSOR | IN THE AIR | IN ARGON GAS | AFTER SLIDING IN THE AIR |
| 14 | $ZrF_4$-BASE GLASS | $PbF_2$ | 0.20 | 0.55 | PbO |
| 15 | $ZrF_4$-BASE GLASS | $PbCl_2$ | 0.20 | 0.61 | PbO |
| 16 | $ZrF_4$-BASE GLASS | $CoF_2$ | 0.25 | 0.62 | $Co_2O_3$ |
| 17 | $ZrF_4$-BASE GLASS | $CoCl_2$ | 0.22 | 0.55 | $Co_2O_3$ |
| 18 | $ZrF_4$-BASE GLASS | $CoBr_2$ | 0.20 | 0.53 | $Co_2O_3$ |
| 19 | $ZrF_4$-BASE GLASS | $ZnF_2$ | 0.21 | 0.49 | ZnO |
| 20 | $ZrF_4$-BASE GLASS | NOT USED | 0.55 | 0.55 | NOT PRODUCED |
| 21 | GeS-BASE GLASS | PbS | 0.18 | 0.49 | PbO |
| 22 | GeS-BASE GLASS | PbSe | 0.15 | 0.57 | PbO |
| 23 | GeS-BASE GLASS | PbTe | 0.19 | 0.54 | PbO |
| 24 | GeS-BASE GLASS | ZnS | 0.20 | 0.26 | ZnO |
| 25 | GeS-BASE GLASS | ZnSe | 0.18 | 0.55 | ZnO |
| 26 | GeS-BASE GLASS | ZnTe | 0.20 | 0.56 | ZnO |
| 27 | GeS-BASE GLASS | SnS | 0.22 | 0.60 | SnO |
| 28 | GeS-BASE GLASS | SnSe | 0.21 | 0.59 | SnO |

TABLE 2-continued

| EXPERIMENT | | | COEFFICIENT OF FRICTION | | SELF-LUBRICATING SUBSTANCE PRODUCED ON SLIDING SURFACE |
|---|---|---|---|---|---|
| No. | MATRIX | PRECURSOR | IN THE AIR | IN ARGON GAS | AFTER SLIDING IN THE AIR |
| 29 | GeS-BASE GLASS | SnTe | 0.17 | 0.58 | SnO |
| 30 | GaS-BASE GLASS | NOT USED | 0.55 | 0.45 | NOT PRODUCED |
| 31 | SIALON CERAMICS | $Mo_2B$ | 0.20 | 0.51 | $MoO_3$ |
| 32 | SIALON CERAMICS | $MoB_2$ | 0.21 | 0.56 | $MoO_3$ |
| 33 | SIALON CERAMICS | $Mo_2C$ | 0.19 | 0.56 | $MoO_3$ |
| 34 | SIALON CERAMICS | $MoSi_2$ | 0.15 | 0.50 | $MoO_3$ |

EXAMPLE 4

Different kinds of ceramics which respectively contained the precursors shown in Table 3 were prepared. Boron-containing silicon nitride ceramics were obtained by blending silicon and boron together and sintering the blend via a reaction in nitrogen gas. Alumina ceramics containing boron oxide and borax as well as silicon carbide ceramics containing boron carbide were prepared by blending precursor powder with starting material powder and carrying out a hot-press process similar to that used in Example 1, However, the samples were held at a temperature at which the respective ceramics showed sintering densities of 95% or more. Regarding sintering atmospheres, nitrogen and argon atmospheres were respectively used for the nitride and carbide ceramics, while sintering of the oxide ceramics was performed in the air. Any of the samples contained the precursor compound by a volume percentage of about 20%. The coefficients of friction between the obtained sliding members were measured in both the air and a nitriding-reducing gas mixture of $20H_2$—$80NH_3$ by a method similar to that used in Example 1. In addition, matrix materials containing no precursor were separately prepared, and their coefficients of friction were measured under similar conditions. The results are summarized in Table 3.

As can be seen from the results shown in Table 3, the coefficients of friction obtained when the sliding members containing the precursors were slid in the gas mixture of $20H_2$—$80NH_3$ are lower than the coefficients of friction obtained under the other conditions.

In addition, from X-ray diffraction and composition analyses by EPMA with respect to their sliding surfaces after the sliding of the samples, it was confirmed that self-lubricating compounds, h-BN, were produced from the sliding members containing the precursors while they were sliding in the gas mixture of $20H_2$—$80NH_3$.

A similar phenomenon is observed in any gas having nitriding-reducing properties other than the gas mixture of $20H_2$—$80NH_3$.

TABLE 3

| | | | COEFFICIENT OF FRICTION | | SELF-LUBRICATING SUBSTANCE PRODUCED ON SLIDING SURFACE |
|---|---|---|---|---|---|
| EXPERIMENT No. | MATRIX | PRECURSOR | IN THE AIR | IN NITRIDING-REDUCING GAS | AFTER SLIDING IN NITRIDING-REDUCING GAS |
| 35 | SILICON NITRIDE CERAMICS | B | 0.51 | 0.15 | h-BN |
| 36 | SILICON NITRIDE CERAMICS | NOT USED | 0.51 | 0.55 | NOT PRODUCED |
| 37 | $Al_2O_3$ CERAMICS | $B_2O_3$ | 0.55 | 0.19 | h-BN |
| 38 | $Al_2O_3$ CERAMICS | $Na_2B_4O_7$ | 0.60 | 0.20 | h-BN |
| 39 | $Al_2O_3$ CERAMICS | NOT USED | 0.60 | 0.60 | NOT PRODUCED |
| 40 | SiC CERAMICS | $B_4C$ | 0.60 | 0.18 | h-BN |
| 41 | SiC CERAMICS | NOT USED | 0.60 | 0.55 | NOT PRODUCED |

In addition, by blending these precursor compounds with metal powder or sinterable polymeric powder and sintering the obtained products, it is possible to provide a self-lubricating-function sliding material of low friction owing to a similar mechanism.

EXAMPLE 5

The coefficients of friction in the air were measured according to the combinations shown in Table 4 in a method similar to that used in Example 1. However, the sulfur-, selenium- and tellurium-dispersed sialon ceramics were respectively prepared by impregnating molten liquids of sulfur, selenium and tellurium into the sialon ceramics of porosity of about 30%. The measurement results of their coefficients of friction are shown in Table 4. Lower coefficients of friction were obtained only when one sliding member was made of tungsten, molybdenum or niobium and the other sliding member was made of the sulfur-, selenium- or tellurium-dispersed sialon ceramics.

In addition, from X-ray diffraction and composition analyses by EPMA with respect to their sliding surfaces after the samples were slid in the molten zinc bath, it was confirmed that the self-lubricating compounds shown in Table 4 were produced from the respective samples.

In addition, by blending these precursor compounds with metal powder or sinterable polymeric powder and sintering the obtained products, it is possible to provide a self-lubricating-function sliding material of low friction owing to a similar mechanism.

TABLE 4

| EXPERIMENT No. | PRECURSOR | MATERIAL WITH WHICH SLIDING MEMBER IS IN SLIDING CONTACT | COEFFICIENT OF FRICTION | SELF-LUBRICATING SUBSTANCE PRODUCED ON SLIDING SURFACE AFTER SLIDING |
| --- | --- | --- | --- | --- |
| 42 | S | TUNGSTEN | 0.10 | WS |
| 43 | S | MOLYBDENUM | 0.18 | MoS |
| 44 | S | NIOBIUM | 0.19 | NbS |
| 45 | S | SIALON CERAMICS | 0.55 | NOT PRODUCED |
| 46 | S | SUS314 | 0.60 | NOT PRODUCED |
| 47 | Se | TUNGSTEN | 0.12 | WSe |
| 48 | Se | MOLYBDENUM | 0.15 | MoSe |
| 49 | Se | NIOBIUM | 0.18 | NbSe |
| 50 | Se | SIALON CERAMICS | 0.49 | NOT PRODUCED |
| 51 | Se | SUS314 | 0.55 | NOT PRODUCED |
| 52 | Te | TUNGSTEN | 0.16 | WTe |
| 53 | Te | MOLYBDENUM | 0.18 | MoTe |
| 54 | Te | NIOBIUM | 0.20 | NbTe |
| 55 | Te | SIALON CERAMICS | 0.55 | NOT PRODUCED |
| 56 | Te | SUS314 | 0.60 | NOT PRODUCED |

EXAMPLE 6

Figure 10:
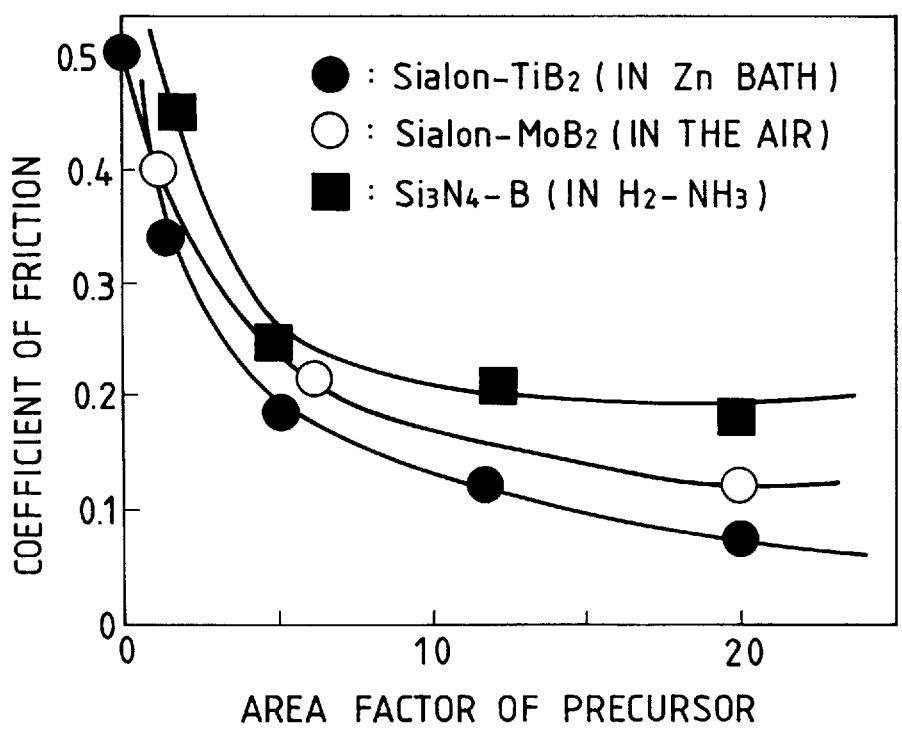
FIG. 10 is a diagram showing the relationship between the area fraction and the coefficient of friction of a precursor on a sliding surface according to an example of the present invention.

Self-lubricating-function sliding members including different contents of precursors according to the present invention were prepared, and the resultant variations in coefficient of friction for various kinds of atmospheres were examined. In FIG. 10, the parenthesized phrases represent the types of sliding atmospheres. As can be seen from FIG. 10, any of the materials showed a lowering in its coefficient of friction when its precursor compound had an area fraction of 5% or more with respect to the surface layer of a sliding portion.

Figure 11:
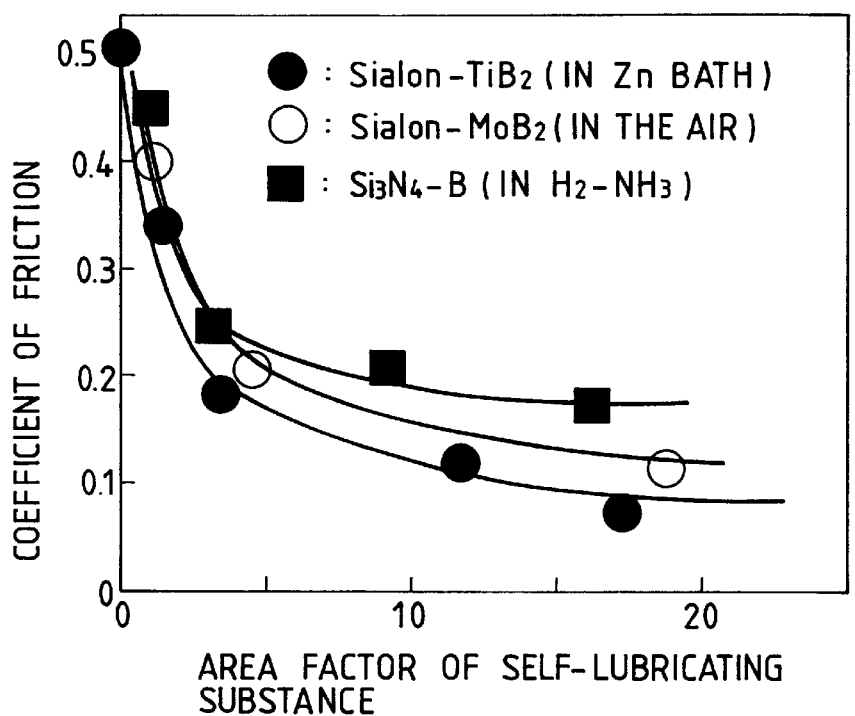
FIG. 11 is a diagram showing the relationship between the area fraction and the coefficient of friction of a self-lubricating compound according to the example of the present invention.

In addition, the relationship between the coefficient of friction and the area fraction of each self-lubricating compound on a sliding surface after sliding was examined. The result was summarized in FIG. 11. The self-lubricating compounds showed lowerings in their coefficients of friction when they had an area fraction of 5% or more.

EXAMPLE 7

Figure 12:
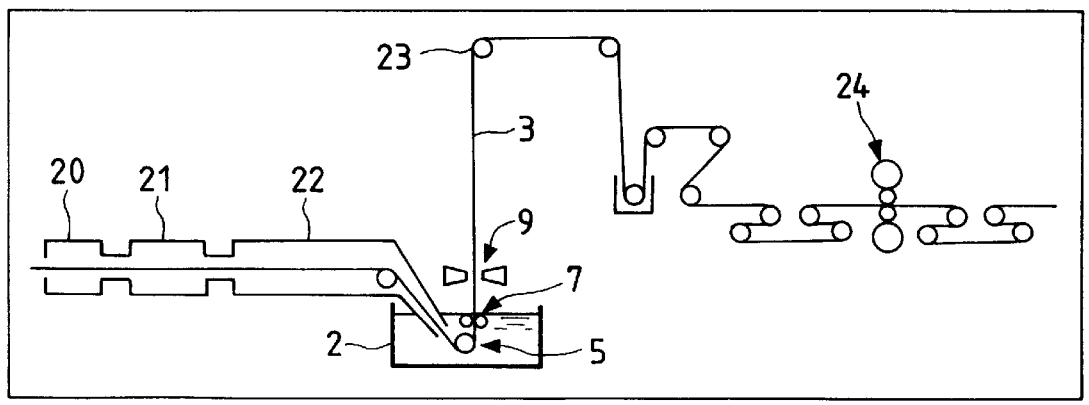
FIG. 12 is a schematic view of a plating line.
Figure 13:
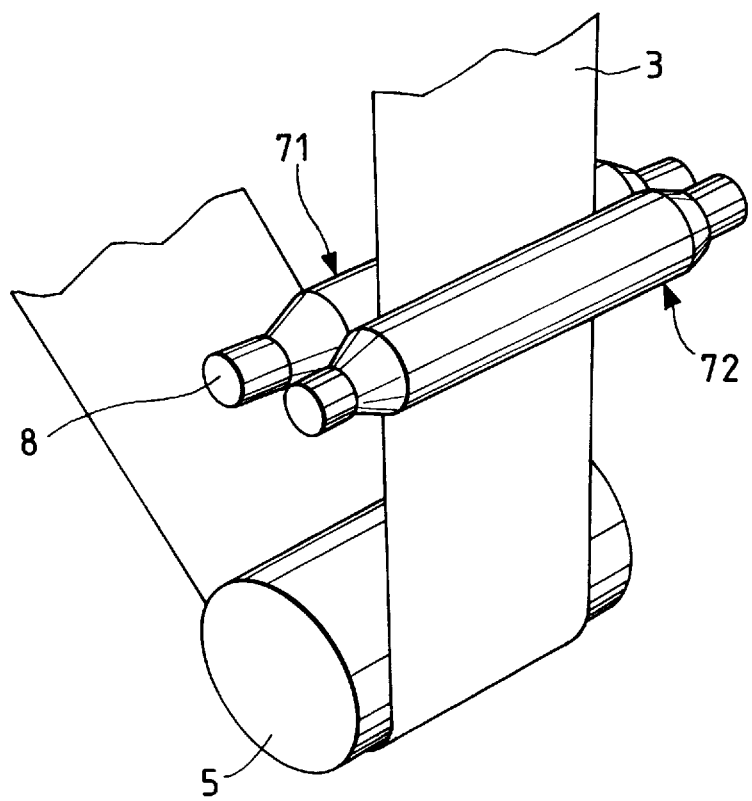
FIG. 13 is a schematic view of a sink roll and finish rolls of a molten metal plating apparatus.
Figure 14A:
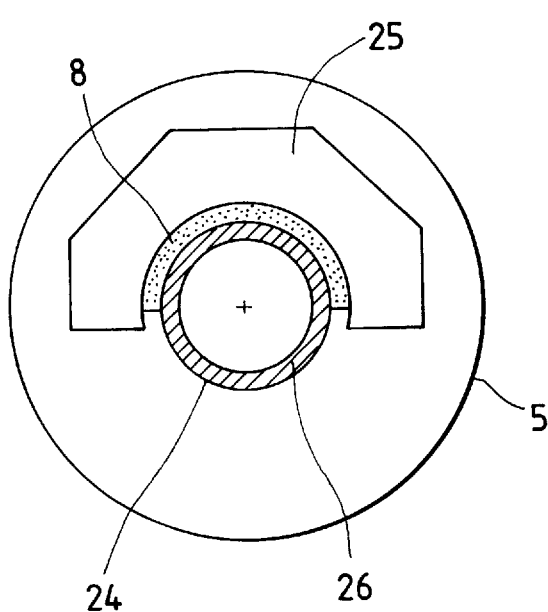
FIGS. 14(a) and 14(b) are cross-sectional views of bearing structures for a sink roll and a finish roll, respectively.
Figure 14B:
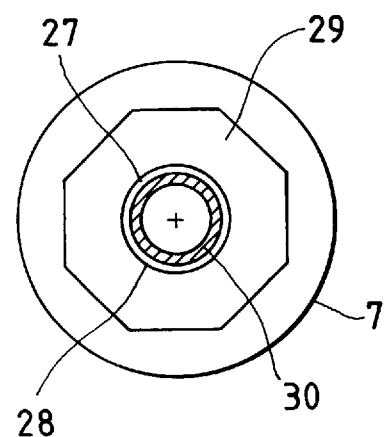

A line for plating zinc on steel plate including a molten metal plating apparatus is shown in FIG. 12. Before reaching the molten metal plating apparatus 2, steel plate 3 is heated in non-oxidation furnace 20 and reduction furnace 21 so that alien substances are removed and surface conditions controlled to be constant, so that zinc plate is adopted easily. Thereafter, the steel plate 3 is processed through cooling zone 22 so that the temperature of the steel becomes about the same as the temperature of the molten zinc (460°~480° C.). In the next step, the steel plate is passed through a molten metal plating apparatus 2, as shown in further detail in FIG. 7. The thickness of the zinc plate is controlled roughly by a sink roll 5 and a final thickness control is done by finish rolls 7, which as shown in further detail in FIG. 13 comprise stabi-roll 71 and correct roll 72. The thickness is controlled by the sink roll by adjusting a tension force of the steel plate 3, and by the finish rolls 7 by adjusting a pressure force applied to the steel plate 3. These rolls 5,7 are used in a molten zinc liquid. The steel plate 3 exiting from the molten zinc liquid is passed through wiping nozzles 9 which remove excess plating material. Then the steel plate 3 passes through plural rolls including top roll 23. Finally, the steel plate 3 is pressed under skin pass-mill 24. A bias view of the rolls in a molten zinc bath is shown in FIG. 13. A diameter of sink roll 5 is 500 mm, a diameter of stabi-roll 71 and correct roll 72 is 240 mm. A schematic view of the bearing structure is shown in FIG. 14. The sink roll 5 includes a ceramic sleeve 24 adopted to fit roll-shaft 26. The ceramic sleeve 24 is supported by a bearing 8 and the bearing 8 is supported by a bearing holder made of heat resistant steel, as shown in FIG. 14(a). A bearing of sink-roll 5 is a form of broken ring, because the sink-roll 5 is pressed only in one direction. A diameter of a sleeve 24 is 165 mm. A sleeve of the finish-roll 7 has the same structure as that of the sink-roll 5, however, a bearing 27 and a bearing holder 29 is a form of tube, because that portion has force applied in all directions. A diameter of a sleeve 28 is 80 mm. A test comparing the present invention with a comparison example in an actual zinc plating production line was executed.

In case of testing a bearing of the sink-roll:

| Test condition | |
| --- | --- |
| A plating metal | Zn + Al (0.15 wt %) |
| A temperature of molten metal | 460~480° C. |
| A load to a bearing | 1,500 kgf |
| rotation speed of roll | 100 rpm |
| size of a bearing | diameter 165 mm |

| Materials of bearing | |
| --- | --- |
| This invention: | a bearing: experiment No. 2 of example 1 a sleeve: sialon ceramic |
| Comparison example: | a bearing: stainless steel (SUS316L) a sleeve: stainless steel with WC coating |

Figure 15:
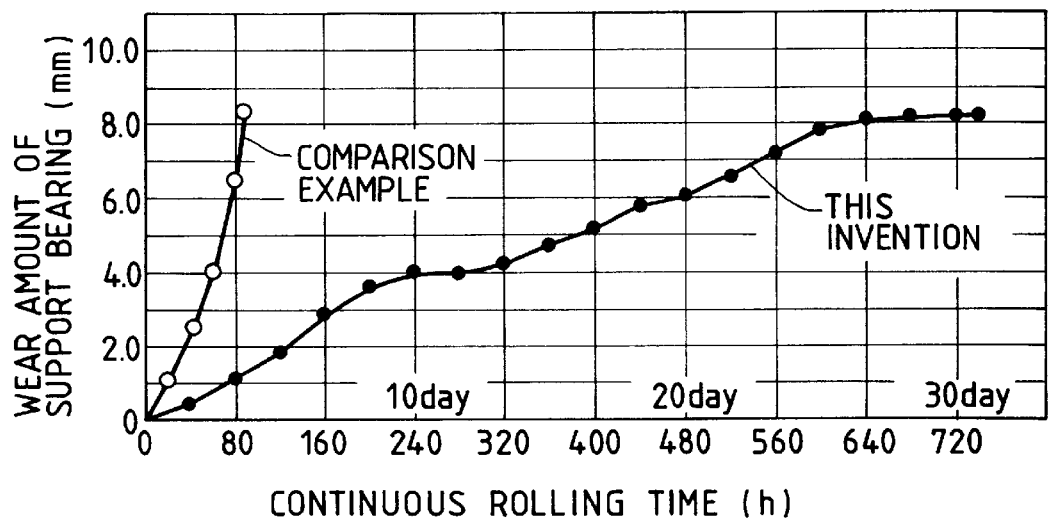
FIG. 15 is a graph showing the relationship between wear amount and continuous rotation time.

The relationship between continuous rotation time and wear amount of bearing is shown in FIG. 15. A wear amount of bearing of the present invention is much less than that of the comparison example. Further, according to another continuous 10 days (240 hours) test, under maximum load force of 2,500 kgf, a wear of the sleeve was not observed according to the present invention, and a wear of bearing was 0.6 mm~0.7 mm/day. The amount of bearing wear was about ⅕ of that of the comparison example. Additionally, variation of a thickness of plated metal was reduced.

In case of testing a bearing of the finish-roll:

| Test condition | |
| --- | --- |
| A plating material | Zn + Al (0.15 wt %) |
| A temperature of molten metal | 460~480° C. |

-continued

| Test condition | |
|---|---|
| A load to a bearing | 1,50 kgf |
| Size of a bearing | diameter 80 mm |

| | Materials of bearing |
|---|---|
| This invention: | a bearing: experiment No. 2 of example 1 |
| | a sleeve: sialon ceramic |
| Comparison invention: | a bearing: stainless steel (SUS316L) |
| | a sleeve: stainless steel with WC coating |

Figure 16A:
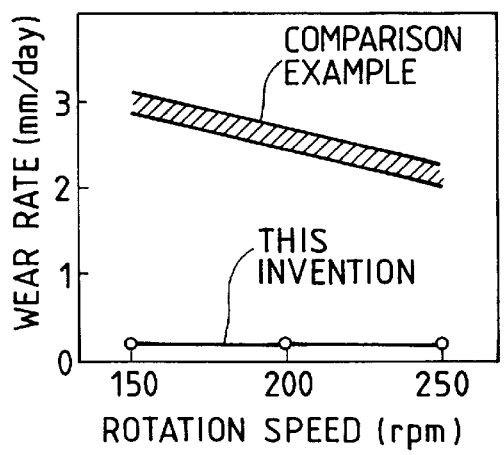
FIGS. 16(a) and 16(b) are graphs showing the relationship between rotation speed and, respectively, wear rate and friction coefficient.
Figure 16B:
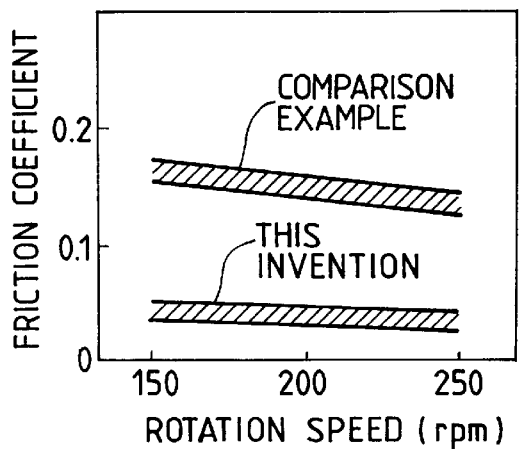

The relationship between rotation speed and wear amount of bearing is shown in FIG. 16(a) and between rotation speed and friction coefficient is shown in FIG. 16(b). A wear amount of bearing of the present invention is much less than that of the comparison example, and the same result is seen in connection with friction coefficient. Further, according to another continuous 10 hours test, under maximum load force of 70~100 kgf, a wear of sleeve and a bearing was not observed according to the present invention. Additionally, variation of a thickness of plated metal was reduced. In the case of the comparison example, the friction coefficient was about 2 times larger than that of the present invention, so that it is necessary to rotate the finish rolls from outside. However, according to the present invention, it is not necessary to do so. Therefore, in using this invention, a structure of the molten metal plating apparatus can be simply made. That is, instead of driving the rolls by an outside force, the finish rolls can be driven solely by the frictional force of the strip being plated as it is passed between the finish rolls.

When this invention is used for both the sink-roll and the finish-rolls, a thickness of plated metal can be 2.8 $\mu$m and variation in thickness of plated metal can be ±0.7 $\mu$m. A present specification for a product requires a thickness of plated metal which can be 4.2 $\mu$m while variation in thickness of plated metal can be ±1.4 $\mu$m. Consequently, the present invention can provide a higher quality product, and the amount of plating metal needed can be reduced so as to save resources of plating metals.

We claim:

1. An apparatus, comprising a plurality of sliding members, wherein at least one of said sliding members comprises a matrix material and a precursor material dispersed in at least a surface region of said matrix material, said precursor material providing a solid lubricant material, different from said precursor material, on a sliding surface of the sliding member by chemical reaction induced by sliding.

2. An apparatus according to claim 1, wherein said precursor material is uniformly distributed on said sliding surface of the sliding member at an area rate of at least 5%.

3. An apparatus according to claim 1, wherein said apparatus is a molten metal plating apparatus for plating a molten metal and wherein said precursor material is reactive with oxygen and with the molten metal during sliding.

4. An apparatus according to claim 3, wherein said molten metal comprises at least one element selected from the group consisting of Zn and Al and wherein said precursor material is at least one carbide or boride of Ti, Zr, Nb, V, Ta and Cr.

5. An apparatus according to claim 4, wherein said at least one of said sliding members is a bearing in said molten metal plating apparatus.

6. An apparatus according to claim 1, wherein said apparatus is for use in an oxidizing atmosphere and wherein said precursor material is at least one compound selected from the group consisting of a halide of Pb, Co or Zn; a sulfide, selenide or telluride of Pb, Zn or Sn; and a boride, carbide or silicide of Mo.

7. An apparatus according to claim 1, wherein said apparatus is for use in a nitriding-reducing gas atmosphere and wherein said precursor material is at least one material selected from the group consisting of boron, boron oxide, borax and boron carbide.

8. An apparatus according to claim 1, wherein said at least one of said sliding members includes at least first and second precursor materials, said first precursor material being reactive with said second precursor material during sliding.

9. An apparatus according to claim 8, wherein said first precursor material is selected from the group consisting of tungsten, molybdenum and niobium, and wherein said second precursor material is selected from the group consisting of sulfur, selenium and tellurium.

10. An apparatus according to claim 1, wherein said matrix material comprises a ceramic material.

11. An apparatus according to claim 10, wherein said ceramic material comprises sialon ceramic.

12. An apparatus according to claim 10, wherein said ceramic material comprises a nitride ceramic.

13. An apparatus according to claim 10, wherein said ceramic material comprises an oxide ceramic.

14. An apparatus according to claim 1, wherein said matrix material comprises glass.

15. An apparatus according to claim 14, wherein said glass comprises a $ZrF_4$ based glass.

16. An apparatus according to claim 14, wherein said glass comprises a GeS based glass.

17. An apparatus according to claim 1, wherein said at least one of said sliding members comprises a matrix material which is a ceramic material and a precursor material selected from the group consisting of sulfur, selenium and tellurium, and wherein another of said sliding members has at least a surface comprising a material selected from the group consisting of tungsten, molybdenum and niobium.

18. An apparatus according to claim 1, wherein said matrix material comprises metal.

19. An apparatus according to claim 1, wherein said matrix material comprises a sintered polymeric powder.

20. An apparatus according to claim 1, wherein said solid lubricant material has a layer crystal structure, a chain-formed crystal structure or cleavage properties.

21. An apparatus comprising a plurality of sliding members, wherein at least one of said sliding members has a solid lubricant on a sliding surface thereof, said solid lubricant being produced by chemically reacting a precursor material, different from said solid lubricant and contained in the sliding member, with another material upon application of heat and pressure caused by sliding.

* * * * *